Patented Mar. 31, 1931

1,798,999

UNITED STATES PATENT OFFICE

CLEMENTS BATCHELLER, OF NASHUA, NEW HAMPSHIRE, ASSIGNOR TO BEMIS INDUSTRIES, INC., OF BOSTON, MASSACHUSETTS, A CORPORATION OF DELAWARE

SURFACE COLORATION OF BODIES

No Drawing.   Application filed December 24, 1927. Serial No. 242,532.

My invention relates to the surface coloration of bodies, and particularly of porous bodies. More specifically my invention relates to the surface coloration of such bodies as tiles, shingles, slabs, etc., whether of a cementitious nature or not, being a continuation in part of my application Ser. No. 117,509, filed June 21, 1926.

One object of my invention is to provide an improved method of obtaining permanent and especially attractive color effects mechanically bound into the surface of the body. Another object is to provide an improved method by which very desirable brown and black shades, and multi-color effects may be obtained.

My co-pending application Serial No. 90,157, filed February 23, 1926, discloses the treatment of porous bodies with metallic salt solutions, following the mechanical incorporation of a mineral coloring matter in the surface during the process of manufacture of the body.

My co-pending application Serial No. 90,156, filed on the same date, discloses a method of treating such bodies to obtain blended color shades upon the surface.

My present invention contemplates successive applications to the surface of a porous body of two types of compounds capable of reacting together to form an insoluble coloring matter in and at the surface of the body. In accordance with the present invention, one of the compounds is capable of oxidation and the other is an oxidizing agent. The compounds are selected so that at least one of the compounds used results, after the reaction, in an insoluble coloring matter firmly bound in and at the surface of the body. The color may be furnished by the oxidized compound or by the reduced oxidizing agent, or by both compounds. The compounds chosen in any case will depend upon the results desired and it is thereby possible to obtain various shades and blended and multi-color effects.

Also, it is within the scope of the present invention to apply to the body additional compounds which upon application to the body will result in insoluble coloring matter but which may or may not enter into the oxidation-reduction reaction.

The porous body may be either neutral or alkaline in its reaction. Wood, wood fibre, plaster board, cloth, paper, bricks, plaster of Paris objects, and bodies made from hydraulic cement, such as cement-asbestos shingles, slabs, tiles, etc., are applicable for treatment according to the present invention. In other words, any body which has absorptive or adsorptive power may be treated and hence surface-colored by a stable coloring matter firmly and substantially permanently bound in and at the surface of the body.

Cementitious surfaces are particularly adapted for treatment, in which case, as in the case of other bodies of alkaline reaction, the alkaline material may enter into reaction with one or more of the solutions added. In some cases, for example, if a heavy metal salt is applied, an insoluble hydroxide or basic salt will be precipitated. If this insoluble compound is capable of oxidation, it will thereafter react with the oxidizing agent to form a stable compound of higher valence.

The choice of the particular compounds, the amounts applied and the time of treatment may be varied and upon these factors the exact shades and colors depend. Of those compounds capable of oxidation, I prefer to use the heavy metal salts in their lower state of valence such, for example, the cuprous, nickelous, manganous, ferrous and cobaltous salts, since these compounds will upon treatment with an oxidizing agent result in the brown or black hydroxides of higher valence known as the "ic" hydroxides. However, if it be desired, to obtain the coloring matter from the oxidizing agent only and not from the compound capable of oxidation, then a compound capable of oxidation which does not form a colored compound may be used, for example, a thiosulphate, a hypophosphite, a sulphite and the like.

The oxidizing agent used will depend upon the compound to be oxidized and the colored effect desired. If the compound capable of oxidation results in the desired color, then an oxidizing agent which will not form an insoluble compound is chosen, for example, a peroxide or a dichromate. If it be desired to obtain the coloring matter from the oxidizing agent, either to furnish the color or to change the color effect, a permanganate, for example, sodium or potassium permanganate is used. By the use of the permanganate, the body will be colored a dark brown or black shade, due to the deposit of manganese dioxide.

For convenience, it is preferable to apply the compounds in the form of a solution since better penetration is thereby possible. In order to obtain a permanently-bound coloration, it is necessary that the two types of compounds be successively applied in contradistinction to their simultaneous application. The order of application is immaterial for the carrying out of the process of the invention, but generally, it is preferable to apply first the compound capable of oxidation followed by treatment with the oxidizing agent.

In a typical case, if a porous body, such as a fibrous cement shingle, is immersed in a solution of a cobaltous salt, preferably one of 3% to 5% concentration, for a period of 15 to 30 minutes, and then withdrawn, it will have been penetrated by the solution to a certain extent, and a precipitate consisting of a light blue basic salt, or a very light pink cobaltous hydroxide or a mixture of both will be formed. This precipitate per se will have practically no color effect upon the body. If the body be then, immediately or subsequently after drying, immersed in a solution of potassium permanganate, preferably one of a ¼ to 1% concentration, for a period of three to five minutes, a brownish coloration of attractive shade will be formed in and at the surface of the body. This coloration is produced by the strong oxidizing action of the permanganate upon the cobaltous compounds contained in the body, and the resultant formation at and in the surface of the latter of a permanent insoluble deposit composed of oxides of cobalt and manganese which are bound into the surface of the body. Any salt, such as the chloride, nitrate or sulphate, may be used. I usually prefer to employ the sulphate since when this salt is added to a body containing free lime, the sulphate radical will combine with the lime forming gypsum, which increases the strength and hardness of the body.

Again, a very desirable shade is obtained if the body is first treated with two salts capable of oxidation, either simultaneously or successively. For example, the porous body (cement-asbestos shingle) is treated with a 2% to 5% solution of ferrous sulfate, followed by treatment with a 3% to 5% solution of cobaltous sulfate. Following these applications, a solution of 2% to 4% of an oxidizing agent, such as peroxide, is applied. Immediately, both the ferrous and cobaltous compounds are converted to the stable ferric and cobaltic compounds respectively, with the accompanying brownish-black permanent coloration of the body. A blended or multicolor effect may be obtained by applying only one of the salts to certain portions of the body while the remaining portions are treated with the other salt or with both salts. If in place of the peroxide, a permanganate solution is used as the oxidizing agent a third deposit, that is a deposit of manganese dioxide, will be obtained which will vary the color somewhat and will produce additional desirable shades. The time of treatment in this example and those following depends upon the concentration and temperature of the solutions, the color shades desired, and conditions of the body being treated. In general, however, it will be found desirable to treat the body with the solution of the oxidizable compound for a period from fifteen to twenty minutes and with the solution of the oxidizing agent from two to three minutes.

As hereinbefore pointed out, the colored effect may be simply that of manganese dioxide, in which case the cement or other body is treated, for example, first with a 5% to 10% solution of sodium thiosulfate and thereafter treated with a ¼% to 1% solution of potassium permanganate.

Striking results are possible by the use of a nickelous salt. The cement-asbestos product or other porous body containing alkali is treated with a 2% to 5% solution of nickelous chloride whereupon the relatively stable nickelous hydroxide is obtained. A solution containing from 2% to 4% of an oxidizing agent is applied and the black nickelic compound is obtained. By this treatment a totally black body is obtained if the oxidizing agent is applied to the whole surface. However, a variegated and blended black colored body is obtained if the oxidizing solution is applied only to certain portions of the surface. In this event, the green nickelous hydroxide will be dispersed in the black nickelic compound in a most striking and desirable manner.

The examples hereinbefore set forth primarily disclose the treatment of a cement body containing lime. The invention, however, is equally applicable to the treatment of neutral bodies such as brick or plaster board in which case the body is treated successively with the two solutions as before, for example, by a 5% solution of cuprous chloride followed by treatment with a 1% solution of potassium permanganate whereupon a brownish-black deposit is obtained at and in the surface of the body due to the deposition of cupric oxide and manganese dioxide. If it is desired to take advantage of the primary reaction with alkali similar to that which occurs with cement body, the neutral body may be treated with a solution of an alkali such as caustic soda prior to the application of the salts. In this case, the oxidizable salt will react with the alkali to form an insoluble hydroxide or basic salt which can then be treated with the oxidizing agent to form the stable compound of higher valence, with or without the deposition of additional coloring matter obtained from the reduced oxidizing agent.

While I have above described the reaction between one or more salts capable of oxidation and an oxidizing agent applied to a body otherwise free from coloration, the same reaction can be obtained upon bodies previously or subsequently treated with other coloring agents. For example, if a body is first treated with a coating or chrome oxide powder, mechanically incorporated in the surface (see my application Ser. No. 90,157 supra), and thereafter with a suitable oxidizable solution, followed by a suitable oxidizing agent applied locally, for example, by sprinkling, then at those areas which receive the solutions the reaction occurs which results in the formation of varying colors superposed upon the green base with a resulting mottled effect.

The treatment disclosed in my co-pending application Serial No. 90,156, filed February 23, 1926, may be used in connection with the present invention if desired. By the long contact between the solutions and the surface of the body there disclosed, it is possible to obtain blended color shades which are very firmly and permanently fixed on the surface of the body.

Other color combinations can be obtained under other conditions, and with other reagents, in which treatments the reaction which forms the subject matter of the present invention, forms but a step in the process. In view of the large number of variations possible in the color effects obtained by choosing various reacting compounds, the specific examples herein given are to be considered only illustrative, the invention broadly comprising the coloration of the surface of a porous body by the deposit of a coloring matter in and at said surface by a reaction caused to take place on the body by bringing there together a compound capable of oxidation and an oxidizing agent, whereupon at least one insoluble colored compound is deposited.

I claim:

1. The method of coloring a porous body which comprises applying a suitable metallic salt solution capable of oxidation to said body and thereafter applying to the body a second soluble substance, capable of reduction, to effect a stable surface coloration of the body by an insoluble compound resulting from the reaction of the oxidizable and the reducible compounds.

2. The method of coloring a porous body which comprises causing a reaction at the surface of the body between an alkali and a suitable metallic salt solution to form an insoluble oxidizable compound and thereafter applying to the body a second soluble substance, capable of reduction, to convert the oxidizable compound into a substantially permanent compound of higher valence, thereby to effect a stable surface coloration of the body.

3. The method of coloring a porous body having an alkaline reaction which comprises applying thereto a suitable metallic salt solution adapted to react with the alkali present in said body to form an insoluble compound capable of oxidation, and thereafter applying to the body a second soluble substance, capable of reduction, to convert the oxidizable compound into a substantially permanent compound of higher valence, thereby to effect a stable surface coloration of the body.

4. The method of coloring a porous body having an alkaline reaction which comprises applying thereto a plurality of suitable metallic salt solutions capable of reaction with the alkali of the body to form insoluble compounds, at least one of which is capable of oxidation, and thereafter causing a reaction between such oxidizable material and a soluble compound capable of reduction to convert said material into a substantially permanent compound of higher valence.

5. In the method specified in claim 4, the application of the metallic salt solutions in sequence to the alkaline body.

6. The method of coloring a porous body which comprises the step of causing a reaction at the surface of the body between a permanganate and an agent capable of reducing the same to manganese dioxide whereby the surface coloration of the body is altered by the deposit of manganese dioxide in and on said surface.

7. The method of coloring a porous body having an alkaline reaction, which comprises treating the same with a suitable metallic salt solution capable of reaction with the alkali of the body to form an insoluble oxidizable compound and thereafter causing a reaction between said compound and a permanganate to change said oxidizable compound into a compound of higher valence, and simultaneously deposit manganese dioxide in and on the surface of the body.

8. The method of coloring a porous body having an alkaline reaction which comprises treating the same with a plurality of suitable metallic salt solutions capable of reaction with the alkali of the body to form insoluble compounds, at least one of which is capable of oxidation, and thereafter causing a reaction between such oxidizable material and permanganate to change said material to a higher valence, and simultaneously deposit manganese dioxide in and on said surface.

9. In the method of claim 8, the application of the metallic salt solutions in sequence to the alkaline body.

10. The method of coloring a porous body which comprises applying a suitable metallic salt solution capable of oxidation to said body and thereafter causing reaction between said salt solution and a soluble compound, capable of reduction at only certain portions of the surface of the body to produce a mottled surface coloration thereof.

11. The method of coloring a porous body having an alkaline reaction which comprises applying thereto a suitable metallic salt solution adapted to react with the alkali present in the body to form an insoluble compound capable of oxidation and thereafter applying to only portions of the surface of the body a soluble compound, capable of reduction, there to convert the oxidizable compound into a substantially permanent compound of higher valence.

12. The method of coloring a porous body having an alkaline reaction, which comprises applying thereto a suitable metallic salt solution adapted to react with the alkali present in the body to form an insoluble compound capable of oxidation and thereafter treating only portions of the surface of the body with a permanganate to thereby change said compound to one of the higher valences and to simultaneously there deposit manganese dioxide.

13. As a new product, a porous body surface colored, at least in part, by insoluble metallic hydroxide and manganese dioxide deposits.

14. The method of coloring a porous body which comprises applying to said body a soluble oxidizable compound and a soluble oxidizing agent, said oxidizable compound and said oxidizing agent being so chosen in relation to each other that at least one insoluble colored compound results upon reaction, and causing a reaction to take place between said oxidizable compound and said oxidizing agent to effect a stable surface coloration of the body by an insoluble oxidized compound.

15. The method of coloring a porous body which comprises bringing together on said body a soluble oxidizable compound and a soluble oxidizing agent in the presence of alkaline material, said oxidizable compound and said oxidizing agent being so chosen in relation to each other that in the presence of the alkaline material at least one insoluble colored compound results upon reaction, and causing a reaction to take place between said oxidizable compound, oxidizing agent, and alkaline material to effect a stable surface coloration of the body by an insoluble oxidized compound.

CLEMENTS BATCHELLER.